United States Patent
Swedo

(10) Patent No.: US 8,293,002 B2
(45) Date of Patent: Oct. 23, 2012

(54) TERTIARY AMINOALCOHOLS AS LOW VOC ADDITIVES FOR PAINTS AND COATINGS

(75) Inventor: Raymond J. Swedo, Mount Prospect, IL (US)

(73) Assignee: ANGUS Chemical Company

( * ) Notice: Subject to any disclaimer, the term of this patent is extended or adjusted under 35 U.S.C. 154(b) by 477 days.

(21) Appl. No.: 12/726,386

(22) Filed: Mar. 18, 2010

(65) Prior Publication Data

US 2010/0275816 A1   Nov. 4, 2010

Related U.S. Application Data

(60) Provisional application No. 61/173,621, filed on Apr. 29, 2009.

(51) Int. Cl.
*C09D 7/12* (2006.01)
(52) U.S. Cl. .................................. 106/287.26
(58) Field of Classification Search ............ 106/31.75, 106/287.26
See application file for complete search history.

(56) References Cited

U.S. PATENT DOCUMENTS

| | | | |
|---|---|---|---|
| 2,363,466 A | | 11/1944 | Senkus et al. |
| 4,443,263 A * | | 4/1984 | Dietz et al. ............... 106/287.24 |
| 5,105,013 A | | 4/1992 | Tanis et al. |
| 6,432,184 B1 * | | 8/2002 | Malhotra et al. ........... 106/31.43 |
| 6,695,900 B2 * | | 2/2004 | Momose .................... 106/31.75 |
| 7,201,796 B2 * | | 4/2007 | Martyak et al. .......... 106/287.26 |
| 2006/0260505 A1 * | | 11/2006 | Ham et al. .................... 106/31.8 |
| 2010/0326320 A1 * | | 12/2010 | Swedo et al. .............. 106/18.32 |
| 2012/0024193 A1 * | | 2/2012 | Van Hemelryck et al. ........................ 106/287.26 |

FOREIGN PATENT DOCUMENTS

WO   2008081036   7/2008

OTHER PUBLICATIONS

Senkus, "Some New Derivatives of Amino Hydroxy Compounds", Journal of the American Chemical Society, 1945, vol. 67, pp. 1515-1519.
Wawzonek, "Reduction of 5-Hydroxymethyl-1-AZA-3,7-Dioxabicyclo[3.3.0]Octane and of 2-Phenyl-4,4-Dimethyloxazolidine with Formic Acid", Org. Prep. Proceed. Int., 1981, vol. 13 No. 2, pp. 126-129.
International Search Report and Written Opinion for PCT/US2010/027749 dated Jun. 25, 2010.

* cited by examiner

*Primary Examiner* — David M Brunsman

(57) ABSTRACT

Provided are polyhydroxy-diamine compounds for use as neutralizing agents for paints and coatings. The compounds are of the formula (I):

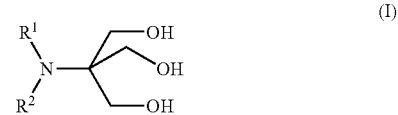

(I)

and salts thereof, wherein $R^1$ and $R^2$ are as defined herein.

11 Claims, No Drawings

TERTIARY AMINOALCOHOLS AS LOW VOC ADDITIVES FOR PAINTS AND COATINGS

CROSS-REFERENCE TO RELATED APPLICATIONS

This application claims priority from U.S. provisional application Ser. No. 61/173,621, filed Apr. 29, 2009, which is incorporated herein by reference in its entirety.

FIELD OF THE INVENTION

The invention relates to tertiary aminoalcohol compounds and their use as low odor, low volatile organic content (VOC) additives for paints and coatings.

BACKGROUND OF THE INVENTION

Amino alcohols are used in aqueous based paints as neutralizing agents. In many geographies, paint manufacturers are facing regulations to reduce the volatile organic content (VOC) of their formulations. Conventional neutralizing amines are 100% volatile and are therefore VOC contributors. In addition, when used in an otherwise low VOC paint formulation, the odor of such amines is more noticeable.

Two alternatives for use as neutralizers, that are by definition non VOC contributors, are ammonia and inorganic bases such as KOH. Ammonia, while an efficient neutralizer, has a very strong odor and is unsuitable for use in low odor paint. Inorganic bases result in coatings with poor scratch and mar resistance.

Efficient neutralizing agents, which both exhibit low or no VOC and have very low or no amine odor, would be a significant advance for the paints and coatings industry.

BRIEF SUMMARY OF THE INVENTION

In one aspect, the invention provides a method for reducing the volatile organic compound content of an aqueous based paint or coating containing a neutralizing agent, a binder, a carrier, and a pigment. The method comprises using as the neutralizing agent in the paint or coating an effective amount of a compound of formula (I):

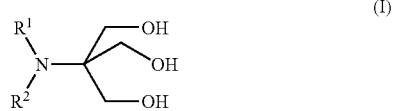

(I)

or salt thereof, wherein $R^1$ and $R^2$ are as defined herein.

In another aspect, the invention provides an aqueous based paint or coating comprising a compound of formula (I) as the neutralizing agent.

DETAILED DESCRIPTION OF THE INVENTION

As noted above, the invention provides methods for reducing the volatile organic compound content of aqueous based paints or coatings by utilizing as the neutralizing agent in the paint or coating an effective amount of a polyhydroxy-diamine compound of formula (I). The invention also provides paints and coatings in which the compound of formula (I) is included as a neutralizing agent.

Neutralizing agents are used in such formulations to raise the pH to a desired value, typically between about 8 and 10. Conventional neutralizing agents currently employed in the industry are VOC contributors. In addition, when used in an otherwise low VOC formulation, the odor of conventional neutralizing agents is more noticeable.

In contrast, the compounds used in the methods and formulations of the invention are excellent low odor materials with the benefit of having no or low VOC. For instance, as demonstrated by the Examples, the compounds exhibit a VOC contribution that is below 20%, whereas 2-methyl-2-amino-propanol, a conventional neutralizing agent, exhibits a VOC contribution of 100%.

In addition to their excellent low VOC and low odor attributes, the compounds used in the methods and formulations of the invention also permit for higher pH formulations to be achieved without addition of significantly larger quantities of the material relative to the entire formulation, thus permitting conservation of materials. Further, the compounds are effective dispersants for pigment particles present in paint and coating formulations, thus serving multiple roles in the formulation and consequently again conserving materials.

The neutralizing agents of the invention are compounds of formula (I):

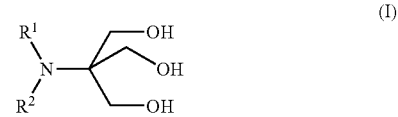

(I)

and salts thereof, wherein $R^1$ and $R^2$ are independently $C_1$-$C_{10}$ alkyl.

Preferably, $R^1$ in formula (I) is $C_1$-$C_6$ alkyl, more preferably $C_1$-$C_4$ alkyl, and particularly preferably, it is methyl, ethyl, or propyl.

Preferably, $R^2$ in formula (I) is $C_1$-$C_6$ alkyl, more preferably $C_1$-$C_4$ alkyl, and particularly preferably, it is methyl, ethyl, or propyl.

Preferred compounds of formula (I) include: 2-(dimethylamino)-2-(hydroxymethyl)-1,3-propanediol; 2-(diethylamino)-2-(hydroxymethyl)-1,3-propanediol; 2-(dipropylamino)-2-(hydroxymethyl)-1,3-propanediol; and 2-[bis(2-methylpropyl)amino]-2-(hydroxymethyl)-1,3-propanediol. A particularly preferred compound is 2-(dimethylamino)-2-(hydroxymethyl)-1,3-propanediol.

Compounds of formula (I) may be prepared by those skilled in the art using well known techniques. The compounds may be used in the invention in the form of acid salts. Suitable salts include, but are not limited to, hydrochloric acid, boric acid, lactic acid, pelargonic acid, nonanoic acid, neodecanoic acid, sebacic acid, azelaic acid, citric acid, benzoic acid, undecylenic acid, lauric acid, myristic acid, stearic acid, oleic acid, tall oil fatty acid, ethylenediaminetetraacetic acid and like materials.

The aqueous based paint or coatings in which a compound of formula (I) is present as a neutralizing agent are used to provide protective and/or decorative barriers for residential and industrial surfaces, such as for floors, automobiles, exteriors and interiors of houses, and other buildings. Typically, such paint or coating formulations, in addition to comprising a neutralizing agent, also comprises a binder, a pigment, and a carrier. Other optional additives may also be included.

Pigments are used to provide the desired color to the final coated material and may also be used to provide bulk to the paint or coating. While multiple pigments may be present in end-use paints or coatings, sometimes only a white pigment, such as a zinc oxide and/or a titanium oxide, is added in the early stages of the formation of the formulation. Any other desired pigments of various colors (including more white pigment) can optionally be added at the later stages of, or after, the formulation is formed.

Pigments may be organic or inorganic. Examples of pigments can include, but are not limited to, titanium dioxide, kaolin clay, calcined kaolin clay, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, quinacridone magenta, quinacridone violet, and the like, and any combination thereof.

Binders are included in the paint and coating formulations to provide a network in which the pigment particles are dispersed and suspended. Binders bind the pigment particles together and provide integrity and adhesion for the paint or coating film. Generally, there are two classes of binders: latex binders are used in aqueous based formulations, and alkyd-based binders are used in non-aqueous formulations, ultimately resulting in latex paints and coatings and alkyd paints and coatings, respectively.

In latex based paint and coating formulations, the binders are typically prepared by free radical initiated aqueous emulsion polymerization of a monomer mixture containing alkyl acrylate (methyl acrylate, ethyl acrylate, butyl acrylate and/or 2-ethylhexylacrylate), alkyl methacrylate, vinyl alcohol/acetate, styrene, and/or acrylonitrile and ethylene type monomers. The amount of the binder in the formulations of the invention can be the amount conventionally used in paint and coating formulations. By way of non-limiting examples, the amount of binder solids may be from about 2% to about 75%, alternatively from about 5% to about 65%, or alternatively from about 20% to about 55%, by weight based on the total weight of the formulation.

The formulations also contain a carrier in which the formulation ingredients are dissolved, dispersed, and/or suspended. In the aqueous based formulations of the invention, the carrier is usually water, although other water-based solutions such as water-alcohol mixtures and the like may be used. The aqueous carrier generally makes up the balance of the formulation, after all the other ingredients have been accounted for.

Other additives may be included in the paint and coating formulations besides the neutralizing agents, pigments, binders, and carriers discussed above. These include, but are not limited to, leveling agents and surfactants, rheology modifiers, co-solvents such as glycols, including propylene glycol or ethylene glycol, corrosion inhibitors, defoamers, co-dispersants, additional aminoalcohol compounds, and biocides.

The paint and coating formulations of the invention may be manufactured by conventional paint manufacturing techniques, which are well known to those skilled in the art. Typically, the formulations are manufactured by a two-step process. First, a dispersion phase, commonly referred to as the grind phase, is prepared by mixing the dry pigments with other grind phase components, including most other solid powder formulation materials, under constant high shear agitation to provide a high viscosity and high solids mixture. This part of the process is designed to effectively wet and dis-agglomerate the dry pigments and stabilize them in an aqueous dispersion.

The second step of the paint manufacturing process is commonly referred to as the letdown or thindown phase, because the viscous grind is diluted with the remaining formulation components, which are generally less viscous than the grind mix. Typically, the binders, any predispersed pigments, and any other paint materials that only require mixing and perhaps moderate shear, are incorporated during the letdown phase. The letdown phase may be done either by sequentially adding the letdown components into a vessel containing the grind mix, or by adding the grind mix into a vessel containing a premix of the latex resins and other letdown components, followed by sequential addition of the final letdown components. In either case, constant agitation is needed, although application of high shear is not required. The neutralizing agent compounds of the invention are typically added to the formulation at one or more of three different places in the manufacturing process: to the pigment dispersion, to the binder dispersion, and/or in a final addition to the paint formulation. The amount used is determined based on the desired pH of the formulation. Typically, an effective amount of the compound is added so as to provide a final pH in the range of about 8 and 10, more preferably about 8.5 to 9.5.

The term "alkyl" as used herein, means a straight or branched chain hydrocarbon containing the indicated number of carbon atoms. If no number is indicated, then alkyl contains from 1 to 6 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, and n-hexyl.

The following examples are illustrative of the invention but are not intended to limit its scope.

EXAMPLES

Example 1

Synthesis of 2-(dimethylamino)-2-(hydroxymethyl)-1,3-propanediol (DMTA)

DMTA, a compound of the invention, is prepared from tris(hydroxymethyl)aminomethane and formaldehyde via a variation of the reductive methylation method described in U.S. Pat. No. 5,105,013. A Raney nickel catalyst is used, and methanol is the solvent. The yield of DMTA is >98%, with a GC area % purity of >98%. IR, NMR, and GC/MS analyses confirm the product identity.

Example 2

VOC of DMTA Compared to Non-Invention n-butyldiethanolamine

In this example, modified EPA test method 24 is used to compare the VOC contribution of DMTA, a compound of the invention, to a non-invention compound (n-butyldiethanolamine). The test method is conducted as follows. The amino compound is weighed into a suitable pan and placed in an oven for 1 h at 105-110° C. The percent weight loss is reported as the VOC, corrected for the water content in the sample which can be measured by Karl Fisher Titration.

DMTA does possess some amine odor, but this is not prominent when blended into a paint formulation. Using the test method, DMTA shows <1% volatiles. In contrast the comparative control, n-butyldiethanolamine, exhibits 21% volatiles.

Example 3

Lab Scale Evaluation as Neutralizing Agent and Co-Dispersant in Semi-Gloss Latex Paint In this example, DMTA is tested as a neutralizing, co-dispersing amine and compared relative to a commercial neutralizer in an aqueous based, latex semi-gloss formulation. The comparative neutralizer is 2-amino-2-methyl-1-propanol (AMP). The tested paint formulation contain the following components:

| Semi-gloss Formula with UCAR ™ Latex DA 633 (low VOC, 24 PVC) | AMP | DMTA |
|---|---|---|
| water | 100.00 | 100.00 |
| Cellosize ™ QP-300 (thickener) | 1.50 | 1.50 |
| Canguard ™ BIT 20-AS (anti-microbial) | 0.50 | 0.50 |
| propylene glycol (glycol) | 10.00 | 10.00 |
| Tamol ™ 731A dispersant, 25% active (dispersant) | 7.00 | 7.00 |
| potassium tripolyphosphate (KTPP) (buffer) | 1.50 | 1.50 |
| Ecosurf ™ SA-9 surfactant (surfactant) | 2.00 | 2.00 |
| Drewplus ® Y-381 defoamer (defoamer) | 1.00 | 1.00 |
| amine active | 1.48 | 2.60 |
| TiPure ® R-902 + titanium dioxide (opacifier and pigment) | 225.00 | 225.00 |
| Polygloss ® 90 kaolin clay (clay) | 25.00 | 25.00 |
| water | 30.00 | 30.00 |
| UCAR ™ Latex DA 633 (latex) (binder) | 425.00 | 425.00 |
| water | 174.40 | 174.40 |
| Acrysol ™ RM 5000, HEUR thickener, 18.5% (thickener) | 32.00 | 32.00 |
| Drewplus ® Y-381 defoamer (defoamer) | 1.50 | 1.50 |
| water | 10.00 | 8.87 |
| Total | 1047.88 | 1047.87 |

DMTA is tested in the formulation relative to the AMP comparative at both an equimolar and an equal weight basis.

The pH, film opacity, film gloss, film yellowing, amine pK value, amine % VOC, and amine odor of the formulations containing the tested compounds are determined as follows.

pH, Low Shear and High Shear Viscosity. The pH of each formulation is measured with a Corning Model 430 pH meter with a ceramic-junction probe. Krebs-units (KU) viscosity is measured with a Stormer viscometer with a stroboscopic timer (ASTM D562). Sample temperatures are 24±1° C., except for the initial values, due to the warming during mixing. The high shear ("ICI") viscosity is measured according to ASTM D 4287 using a Brookfield CAP 1000+ viscometer at a shear rate of 12,000 s$^{-1}$ at 900 rpm, with a 0.45° cone of radius 1.511 cm, and a sample temperature controlled at 25° C.

Gloss at 60° C., Opacity, and Yellowing. Color and gloss measurements are done on films applied with a 3-mil wet-film drawdown bar to Leneta Form 3-B opacity charts. Additional drawdowns are made from the heat-aged stability samples after 2 weeks at 60° C. Panels are dried at least 24 hours at room temperature before measurement.

Color measurements are done with a BYK-Gardner Color Guide Sphere color meter (D65 source/10° observer), which measures reflectance spectra in conformity to ASTM E 1164. The meter calculates color parameters according to the CIE L*a*b* color system. Yellowness is reported here in terms of the b* (yellow-blue scale) parameter.

Gloss at 60° is measured with a BYK-Gardner micro-TRI-gloss meter in accordance with ASTM D 523.

Scrub Resistance. Wet-scrub resistance is measured with a Gardco-Model D10 washability, wear, and friction tester, with a fixed speed of 37 cycles/minute according to ASTM D 2486. Replicate side-by-side drawdowns are drawn on Leneta P-121-10N black plastic panels with the 7-mil gap side of a Dow latex bar. The panels are dried 7 days at 50% relative humidity at 25° C. The panels are secured to the stage of the scrub tester with shims under each of the side-by-side films to give a raised test area. Before each 400 cycles of the test, 10 g of the specified abrasive medium and 5 mL of water are placed in the path of the scrub brush. The end point for each paint film is recorded when the brush wears a continuous line of complete paint removal across the width of the raised test surface.

Blocking Resistance. Blocking is measured according to ASTM D 4946 at room temperature and at 50° C. Films of 3-mil wet-film thickness applied to opacity charts are dried for 3 and 7 days at 50% relative humidity at 25° C. before testing. For each test, coated panels are cut into triplicate pairs of 1½ inch squares. Each pair of squares is placed face to face, then each pair is covered with a No. 8 rubber stopper. A 1 kg weight is placed on the rubber stopper. The room temperature tests are conducted for 1 hour, and the 50° C. oven tests are conducted for 30 minutes. At the end of each time period, the weights are removed and the pairs of squares are peeled apart with slow, steady force. The amount of adhesion is observed and evaluated on a scale of 0 (greatest adhesion) to 10 (least adhesion).

Amine pK. Amine pK values are determined by titration; amine VOC values are determined via EPA method 24 as described above;

The data are shown in Table 1.

TABLE 1

Performance Properties of AMP And DMTA

| | PROPERTY | | |
|---|---|---|---|
| | | DMTA[2] | |
| | AMP[1] | EQUAL WEIGHT | EQUIMOLAR |
| FORMULATION pH | 9.4 | 8 | 8.9 |
| FILM OPACITY | 95.0 | 96.2 | 98.1 |
| FILM GLOSS, 60° | 77.5 | 73.1 | 75.6 |
| FILM YELLOWING (QUVB, 100 HRS., 55° C.) | 1.75 | 0.99 | |
| AMINE pK VALUE | 9.72 | | 9.1 |
| AMINE % VOC | 100.0 | | <1 |
| AMINE ODOR | sharp | | slight |

[1]Comparative compound.
[2]Compound of the invention prepared as described in Example 1.

As can be seen from the data in Table 1, DMTA provides higher opacity values, less yellowing, lower VOC contribution, and less amine odor than AMP. Film gloss values are comparable. DMTA exhibits the additional advantage of lower odor and zero VOC contribution Example 4

Kilogram Scale Evaluation in Semi-Gloss Latex Paint

The performance of DMTA is compared to AMP in semi-gloss latex paint formulations in kilogram-scale lab studies. The DMTA and AMP are tested on an approximately equimolar basis.

The performance data is shown in Table 2.

TABLE 2

Kilogram scale evaluation.
Semi-gloss Formula with UCAR ™ Latex DA 633 (low VOC, 24 PVC)

|  | AMP | DMTA |
|---|---|---|
| pH, initial/1 day | 9.53/ 9.54 | 9.32/ 9.29 |
| 1 week @ 60° C. | 9.17 | 8.99 |
| 2 weeks @ 60° C. | 9.06 | 8.87 |
| viscosity (KU), 1 day | 91 | 92 |
| 1 week @ 60° C. | 86 | 85 |
| 2 weeks @ 60° C. | 86 | 86 |
| ICI viscosity (P), 1 or 2 days | 0.90 | 0.90 |
| 1 week @ 60° C. | 0.77 | 0.78 |
| 2 weeks @ 60° C. | 0.76 | 0.81 |
| opacity, initial (1 or 2 days) | 97.88 | 97.98 |
| 1 week @ 60° C. | 97.30 | 97.51 |
| yellowness (b* parameter), initial (1 or 2 days) | 1.84 | 1.92 |
| 1 week @ 60° C. | 1.97 | 1.96 |
| gloss, 60° initial (1 or 2 days) | 49.3 | 48.1 |
| 1 week @ 60° C. | 42.6 | 44.3 |
| Scrub resistance, delta % relative to AMP | reference | −24% |
| Blocking resistance, 1/3 days cure 50° C., 30 minutes | 5/7 | 5/6 |

Again, except for scrub resistance, the DMTA formulation performs comparably to the AMP formulation, but has the advantage of lower odor and zero VOC contribution.

While the invention has been described above according to its preferred embodiments, it can be modified within the spirit and scope of this disclosure. This application is therefore intended to cover any variations, uses, or adaptations of the invention using the general principles disclosed herein. Further, the application is intended to cover such departures from the present disclosure as come within the known or customary practice in the art to which this invention pertains and which fall within the limits of the following claims.

What is claimed is:

1. A method for reducing the volatile organic compound content of an aqueous based paint or coating that contains a neutralizing agent, a binder, water, and a pigment, the method comprising using as the neutralizing agent an effective amount of a compound of formula (I):

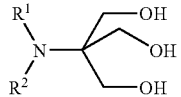

or salt thereof, wherein $R^1$ and $R^2$ are independently $C_1$-$C_{10}$ alkyl.

2. A method according to claim 1 wherein $R^1$ is $C_1$-$C_6$ alkyl.

3. A method according to claim 1 wherein $R^1$ is $C_1$-$C_4$ alkyl.

4. A method according to claim 1 wherein $R^2$ is $C_1$-$C_6$ alkyl.

5. A method according to claim 1 wherein $R^2$ is $C_1$-$C_4$ alkyl.

6. A method according to claim 1 wherein $R^1$ and $R^2$ are both selected from methyl, ethyl, and propyl.

7. A method according to claim 1 wherein the compound of formula (I) is: 2-(dimethylamino)-2-(hydroxymethyl)-1,3-propanediol; 2-(diethylamino)-2-(hydroxymethyl)-1,3-propanediol; 2-(dipropylamino)-2-(hydroxymethyl)-1,3-propanediol; or 2-[bis(2-methylpropyl)amino]-2-(hydroxymethyl)-1,3-propanediol.

8. A method according to claim 1 wherein the compound of formula (I) is: 2-(dimethylamino)-2-(hydroxymethyl)-1,3-propanediol.

9. An aqueous based paint or coating comprising a neutralizing agent, a binder, a carrier, and a pigment, wherein the neutralizing agent is a compound of formula (I):

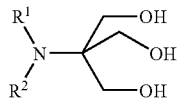

or salt thereof, wherein $R^1$ and $R^2$ are independently $C_1$-$C_{10}$ alkyl.

10. An aqueous based paint or coating according to claim 9 further comprising one or more additional ingredients selected from: leveling agents, surfactants, rheology modifiers, co-solvents, corrosion inhibitors, defoamers, co-dispersants, additional aminoalcohol compounds, and biocides.

11. A method according to claim 1 wherein $R^1$ is methyl, ethyl or propyl.

* * * * *